Nov. 24, 1970 P. A. E. GARDNER ET AL 3,543,296

DATA STORAGE CELL FOR MULTI-STABLE ASSOCIATIVE MEMORY SYSTEM

Filed June 28, 1968 3 Sheets-Sheet 1

| | | INPUT | | |
|---|---|---|---|---|
| | | 0 | 1 | NULL |
| STORED | 0 | M | N | M |
| | 1 | N | M | M |

M=MATCH
N=NO MATCH

| | | INPUT | | |
|---|---|---|---|---|
| | | 0 | 1 | NULL |
| STORED | 0 | M | N | M |
| | 1 | N | M | M |
| | X | M | M | M |

M= MATCH
N= NO MATCH

INVENTORS
PETER A.E. GARDNER
MICHAEL H. HALLETT
PETER J. TITMAN

BY James E. Murray
ATTORNEY

DATA STORAGE CELL FOR MULTI-STABLE ASSOCIATIVE MEMORY SYSTEM

Filed June 28, 1968

United States Patent Office 3,543,296

Patented Nov. 24, 1970

3,543,296

DATA STORAGE CELL FOR MULTI-STABLE ASSOCIATIVE MEMORY SYSTEM

Peter A. E. Gardner, Winchester, Michael H. Hallett, Chandler's Ford, and Peter J. Titman, Winchester, England, assignors to International Business Machines Corporation, Armonk, N.Y., a corporation of New York

Filed June 28, 1968, Ser. No. 740,939
Claims priority, application Great Britain, Sept. 5, 1967, 40,623/67
Int. Cl. G11c *11/36*
U.S. Cl. 340—173 6 Claims

ABSTRACT OF THE DISCLOSURE

This specification describes data storage cells for associative memories. These storage cells have either a tristable circuit or two bistable circuits which are coupled together to provide the storage cells with at least three stable states. The three stable states are referred to in the specification as the "1," the "0" and the "X" stable states. The storage cells can be interrogated for the "1" and the "0" stable states and issue match signals whenever the storage cell is in the interrogated state or the "X" state.

BACKGROUND OF THE INVENTION

This invention relates to data storage cells and more particularly to data storage cells employed in associative memories.

Data storage cells employed in an association memory can be transistor circuits having first and second stable states of conductivity and interrogatable for first and second states respectively by different interrogation signals. Such associative memory storage cells when interrogated for the first stable state generate a first output signal if the circuit is in the first stable state and generate a second output signal if the circuit is in the second stable state. Likewise when interrogated for the second stable state these storage cells generate the first output signal if the circuit is in the second stable state and generate the second output signal if the circuit is in the first stable state. It has been found that it would be desirable if such associative memory storage cells had a third stable state.

SUMMARY

Therefore in accordance with the present invention, associative memory storage cells are provided which have three stable states. These storage cells are adapted to generate the first output signal when the circuit is in the third stable state in response to interrogation for the first stable state, and in response to interrogation for the second stable state.

Therefore it is an object of the present invention to provide a storage cell with three stable states of operation for use in associative memories.

It is another object of the present invention to provide a data storage cell for associative memories which has two bistable circuits connected together to provide the storage cells with at least three stable states.

It is still another object of the invention to provide storage cells for assocative memories which have three stable states and issue a match signal when the cell is in the third stable state and is interrogated for either of its two other stable states.

DESCRIPTION OF THE DRAWINGS

The foregoing and other objects, features and advantages of the invention will be apparent from the following more particular description of the preferred embodiments of the invention as illustrated in the accompanying drawings of the invention of which:

FIG. 1 of the drawings shows, schematically, part of a known associative, or content-addressed memory. The characterizing feature of such a memory is that a data word is retrieved from the store by specifying at least part of data contained in the word. This is in contrast to a conventional memory in which a data word is retrieved by specifying the address in the memory at which the word is located. For example, in an associative memory in which each data word consists of a part number and the number of parts in stock, by specifying a part number the associated data word can be retrieved and the stock level found, or alternatively, by specifying a predetermined stock level, the part numbers of all those parts at that stock level can be found. In a conventional memory, the latter information can only be found by accessing each data word and examining the stock level of each part.

Figures 1, 2, 3:
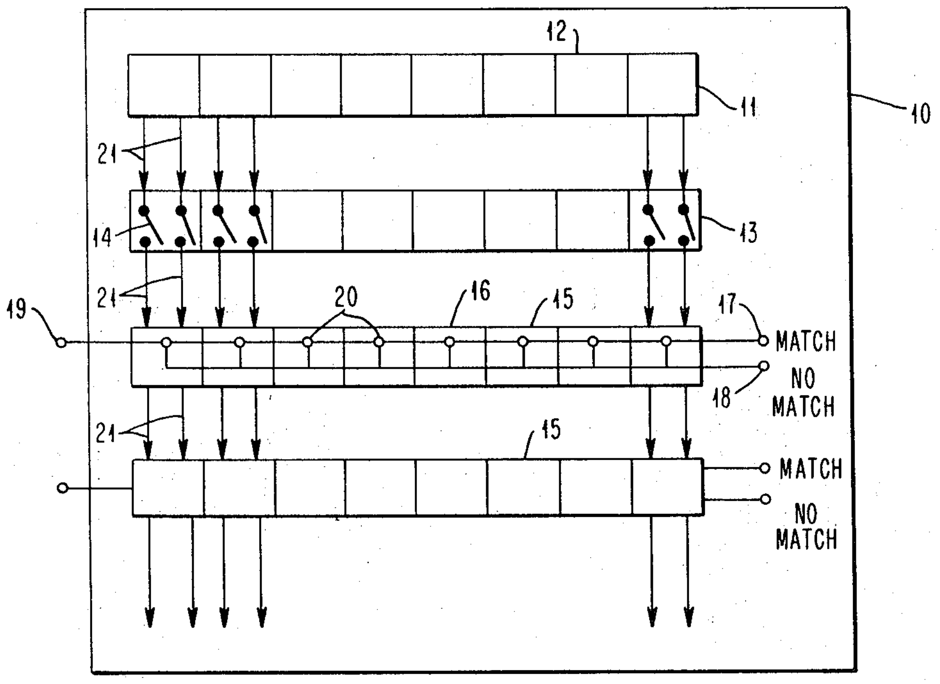
FIG. 1 is a schematic diagram of a typical known associative memory.
FIG. 2 is the truth table of a data storage cell used in an associative store of the kind illustrated in FIG. 1.
FIG. 3 is the truth table of a data storage cell according to the invention.

The associative memory 10 shown in FIG. 1 includes an input register 11 comprising a plurality of binary data storage cells 12, a mask register 13 comprising a plurality of masking circuits 14, one circuit to each order of the input register 11, and a number of word lines 15 each comprising a plurality of data storage cells 16. When a word is entered into input register 11 all or part of the word is compared with the contents of each of the word lines 15. If the data being compared is identical with the contents of a word line 15 an indication to this effect is given at a match terminal 17 associated with the word line. An indication of lack of identity is given at a no match terminal 18. The comparison operation is illustrated schematically as a current switching operation under the control of current switches 20 of which there is one to each storage cell 16 of each word line. Current is supplied to a terminal 19. If the binary digit stored in the storage cell is equal to the digit with which it is being compared the switch 20 of the cell directs the current towards the match terminal 17. If the digits are unequal, switch 20 diverts the current towards the no match terminal 18. The data to be compared is supplied from the input register 11 as a marking of one out of the two lines 21 from each cell 12 of register 11. The lines 21 are connected to the cell 16 in each word line 15 in the associative store 10 which corresponds in order to the cell 12 from which the lines issue. The function of the masking register 13 is to mask from the word line 15 the data in register 11 which is not to be compared with the contents of the word line. Accordingly, masking register 13 is shown schematically as providing a switch 14 in each line 21 issuing from input register 11. When a switch 14 is open (as shown) the signal on connected line 21 does not reach the word lines 15. Each current switch 20 is arranged to direct current towards the match terminal 17 in the absence of any input signals on lines 21 connected to the cell 16 containing the switch. Such an input on lines 21 is known as a null input and is often in the form of balanced signals on both lines 21. Further details of the associative store 10 are not of relevance to the invention, but it will be understood that means are provided to utilize the signals on the match or no-match terminals to control the accessing of particular word stores.

From the above description, it will be understood that the data storage cell used in known associative stores has the truth table shown in FIG. 2. The extreme left-hand column of the table shows the binary digit represented by state of the storage cell, while the top row represents the interrogating signals supplied to the cell on lines 21. The entries in the table show the response of the current-switch 20 of the cell to the interrogating signal.

One of the drawbacks of the conventional associative store is that every state of every cell in the word stores would be significant without the masking register. If it required to ignore for comparison purposes the contents of a particular cell, it is necessary to operate the masking register which prevents comparison of all cells in the same column of the associative store as the particular cell. This consideration and a need for greater flexibility in the use of associative stores has led to the conclusion that it is desirable to provide a storage cell having the truth table shown in FIG. 3. Each storage cell has three states represented by 1, 0 and X. When the storage cell is in the X state, it gives a match output to any interrogation signal.

According to the invention there is provided a transistor circuit for implementing a storage cell having 1, 0 and X states.

Figure 4:
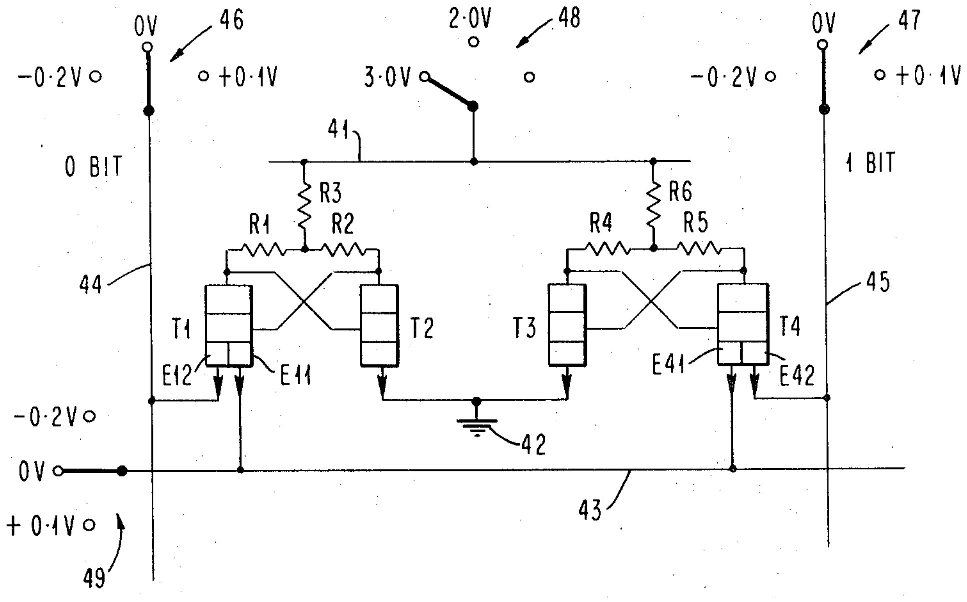
FIG. 4 is a circuit diagram of a data storage cell according to the invention.

One example of a transistor circuit according to the invention is shown in FIG. 4. The cell shown in FIG. 4 has, in fact, four states. The fourth state, Y, is such that, in response to 1 or 0 interrogation signals, the cell issues a no match output. However, the provision and use of the four state is not an essential feature of the invention.

The data storage cell of FIG. 4 comprises two bistable circuits each including a pair of directly cross-coupled transistors. The states of the cell are each characterized by two transistors being conductive one from each pair. One bistable circuit comprises a double-emitter transistor T1 which is directly cross-coupled to transistor T2. The collector of transistor T1 is connected to a collector voltage supply line 41 through series resistors R1 and R3. The collector of transistor T2 is connected to line 41 through series resistors R2 and R3. The emitter of transistor T2 is directly connected to a reference voltage source 42, which is shown as ground. In practice the value of the reference voltage will depend on the characteristics of the circuit. Any voltage mentioned in this description is measured relative to the reference voltage. Emitter E11 of transistor T1 is directly connected to a word emitter line 43, the function of which is to provide match or no match signals. Emitter E12 of transistor T1 is directly connected to 0 bit line 44, the functions of which will be explained later. The other bistable circuit is comprised of transistor T3 and double-emitter transistor T4 which are directly cross-coupled in the same way as transistors T1 and T2. The collectors of transistors T3 and T4 are connected to collector voltage line 41 through a resistor network R4 to R6, identical with network R1 to R3. The emitter of transistor T3 is directly connected to the reference voltage ground 42 while emitter E41 of transistor T4 is directly connected to word emitter line 43 and emitter E42 of transistor T4 is directly connected to a 1 bit line 45, the functions of which will be described later. Various switches have been schematically indicated in FIG. 4 as mechanical switches having moving contact arms. In practice, these switches, which are for supplying control voltages to the cell, would be embodied as electronic switches.

Switches 46 to 49 are three terminal switches. Switches 46 and 47 connect the 0 bit line 44 and the 1 bit line 45, respectively, to voltages of −0.2V, 0V (the reference voltage), or +0.1V depending on the terminal on which the switch arm is closed. Switch 49, similarly, selectively connects the word emitter line 43 to voltages of −0.2V, 0V or +0.1V. Switch 48 terminals connect the collector voltage line to voltages of 3.0V or 2.0V, or render the line floating.

The four states of the data storage cell of FIG. 4 are:

1 state: T2 and T4 conductive;
0 state: T1 and T3 conductive;
X state: T2 and T3 conductive, and
Y state: T1 and T4 conductive.

A no match condition is signalled by the presence of current on word emitter line 43 and a match condition is signalled by the absence of current on line 43. The 0 and 1 bit lines 44 and 45 are used to set the data cell to a required state, to read the state of the data cell, and to supply interrogation signals which result in match or no match signals on line 43 according to the truth table of FIG. 3 and a no match signal, in response to 1 or 0 interrogation signals, if the cell is in the Y state.

In the quiescent state, switch 48 is closed on the 3.0V terminal, and switches 46, 47 and 49 are closed on their respective 0V terminals.

In order to interrogate the cell for a match or no match output, and without changing the state of the date cell, switches 46 and 47 are manipulated. If the interrogation is for the 0 state, switch 46 is closed on the −0.2V terminal and switch 47 is closed on the +0.1V terminal. If the cell is in the 0 state, transistor T1 is conducting and the reduction of voltage on line 44 causes substantially all the current to flow only in emitter E12 and line 44, substantially none reaching the word emitter line 43. Transistor T4 is not conducting and the change in voltage on line 45 does not affect this transistor, with the result that no current reaches line 43 from transistor T4. Since there is substantially no current on line 43, a match is indicated. If the cell is in the 1 state, transistor T4 is conducting. No current reaches line 43 from transistor T1, but the raised voltage on line 45, without affecting the conductive state of transistor T4, ensures that current flows in emitter E41 and line 43 producing a no match signal. If the cell is in the X state, neither transistor T1 nor transistor T4 is conducting and no current will reach line 43, indicating a match. If the cell is in the Y state transistor T4 is conducting and current is steered onto line 43, indicating a no match. To interrogate for the 1 state, switch 47 is closed on the −0.2V terminal and switch 46 is closed on the +0.1V terminal. In similar fashion to the 0 state interrogation just described, current is diverted to the word emitter line 43 if the cell is in the 0 or Y states, but no current reaches the line 43 if the cell is in the 1 or X states. For a null interrogation both switches 46 and 47 are closed on the +0.2V terminal thus preventing current reaching the line 43 whatever the state of the cell.

In order to read the state of the cell, without changing that state, switch 49 is closed on the +0.1V terminal and switches 46 and 47 are closed on their 0V terminals. Current is then diverted onto neither, both or one of the bit lines 44 and 45, depending on the state of the cell. If transistor T1 is conductive, current flows through emitter E12 and line 44, while if transistor T4 is conductive current flows through emitter E42 and line 45. Thus, current in only line 44 indicates that the cell is in the 0 state, current in only line 45 indicates that the cell is in the 1 state, current in neither line 44 nor 45 indicates that the cell is in the X state and current in both lines 44 and 45 indicates that the cell is in the Y state.

Writing into the cell of FIG. 4 is effected by lowering the voltage powering the cell so as to lower the switching threshold of the bistable circuits. Copending application Ser. No. 675,377, filed Jan. 3, 1968, describes how the storage cells are thus sensitized so as to be responsive to small voltage changes at the emitters of double emitter cells. In the cell shown in FIG. 4, this is accomplished by closing switch 48 on the 2.0V terminal and closing switch 49 on the 0.1V terminal. With the switching threshold thereby lowered, the same voltages as are used in interrogating the cell are now effective to switch the bistable circuits while the voltage across the cell is mounted at this lower level. Therefore if it is required that transistor T1 be made conducting, switch 46 is closed on the −0.2V terminal, or if transistor T1 is to be made nonconducting switch 46 is closed on the +0.1V terminal. Similarly, switch 47 is closed on the −0.2V or +0.1V terminal, respectively, if transistor T4 is to be made conducting or nonconducting, respectively. Thus, if transistors T1 and T3 are conducting and it is required to cause the cell to assume the X state, this may be done by closing switch 48 on the 2.0V terminal, switch 49 on the +0.1V terminal, and switch 46 on the +0.1V terminal, thereby making transistor T1 nonconducting and transistor T2 conducting. The writing of a "1," "0" or "Y" can also be accomplished in the same manner by turning on the appropriate transistors (see the table on page 8 of the specification). As can be seen, information can be written into the cell without changing the previous state of the cell. Alternatively, writing may be effected after destroying the previous state of the cell by momentarily closing switch 48 on the floating terminal.

As shown, switch 49 has a −0.2V terminal. This is used to isolate the data cell from the bit lines, since, if the switch is closed in this terminal signals on a bit line are ineffective to commute current between the emitters of the connected double-emitter transistor, or to change the conductive state of the resistor. Such isolation is necessary when it is required to read, or write into, a data cell connected to the same bit lines as those shown in FIG. 4.

Figure 5:
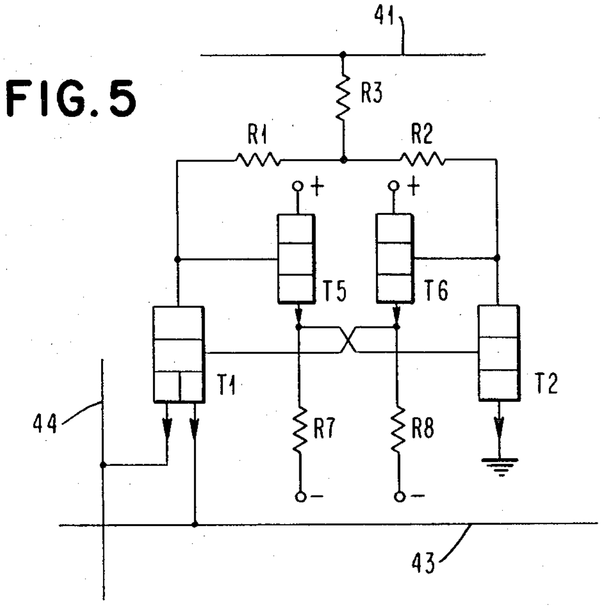
FIG. 5 is a circuit diagram of part of another data storage cell according to the invention.

In order to prevent spurious currents it is necessary that the transistors be operated out of hard saturation. This leads to difficulties in tolerancing the signals on the bit lines, for it is necessary that the signals on the bit lines be sufficient to switch current between the emitters of the two-emitter transistors without disturbing the state of the cell. One method of achieving higher switching thresholds while keeping the transistors out of saturation is illustrated in FIG. 5 which shows one of the bistable circuits in a cell according to the invention. In FIG. 5 elements common to both FIGS. 4 and 5 are referenced as in FIG. 4. As can be seen this bistable circuit differs from those as shown in FIG. 4 in that emitter follower circuits T5 and R7, and T6 and R8 are connected in the collector to base cross-connections of the bistable circuit. The effect of the emitter followers is to necessitate higher magnitude switching voltages on bit line 44 to switch the bistable circuit of FIG. 5 than would be necessary on the bit lines in FIG. 4. Of course, the emitter folliwer circuits are provided in the cross-coupling of both the bistable circiuts of a data cell in which they are used.

Figure 6:
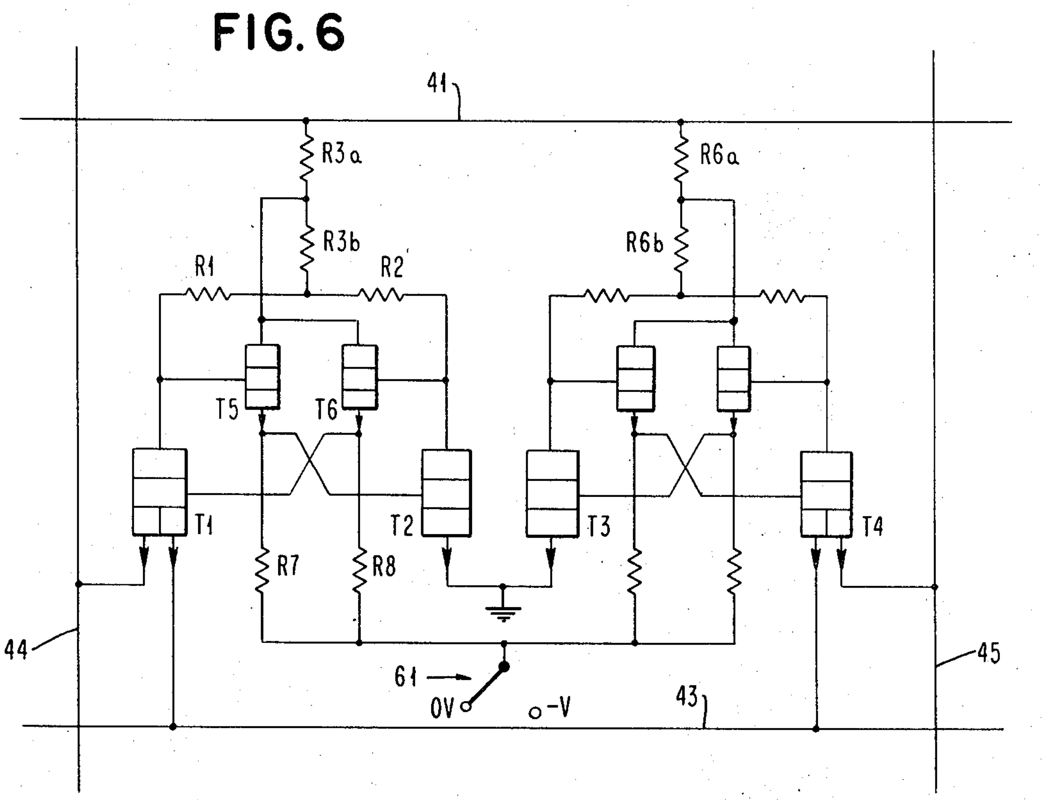
FIG. 6 is a modification of the data storage cell of FIG. 5.

FIG. 6 shows a modification of the circuit of FIG. 5 and uses the same numbers as used in FIGS. 4 and 5 for elements common to those circuits. For clarity, both bistable circuits comprising the data cell have been shown in FIG. 6. In the embodiment shown in FIG. 6, the switch 48 in the collector voltage line of the embodiment illustrated in FIG. 4 is dispensed with and is replaced by a switch 61, the contact arm of which is movable between terminals supplying 0V and a negative voltage respectively, and is connected to the ends, which are commoned, of the emitter resistors, such as R7, R8, remote from the emitter follower transistors, such as T5 and T6. The collectors of the emitter follower transistors T5, T6, of the bistable circuit including transistors T1 and T2 are commoned and connected between series-connected resistors R3*a*, R3*b* which replace the resistor R3 of FIGS. 4 and 5. The collectors of the emitter follower transistors of the other bistable circuit comprising the data cell are similarly connected between resistors R6*a*, R6*b*, which replace resistor R6.

The circuit of FIG. 6 provides an effective means for selectively varying the switching thresholds of the bistable circuits so that signals on the bit lines 44, 45 may be used either to interrogate the state of the data cell or to write new information into the cell. When the contact arm of switch 61 is closed on the 0V terminal interrogation signals of predetermined voltages are effective to commute current between the emitters of the double-emitter transistors T1, T4 but do not switch the bistable circuits. Under these conditions the emitter followers operate with very little power dissipation. By closing switch 61 on the negative terminal, the currents through resistors R3*b* and R6*b* are reduced and the currents through the emitter resistors increased. This renders the bistable circuits much more sensitive to the signals on bit lines 44 and 45, and signals of the same predetermined voltages as the interrogation signals are effective to switch the bistable circuits.

Figure 7:
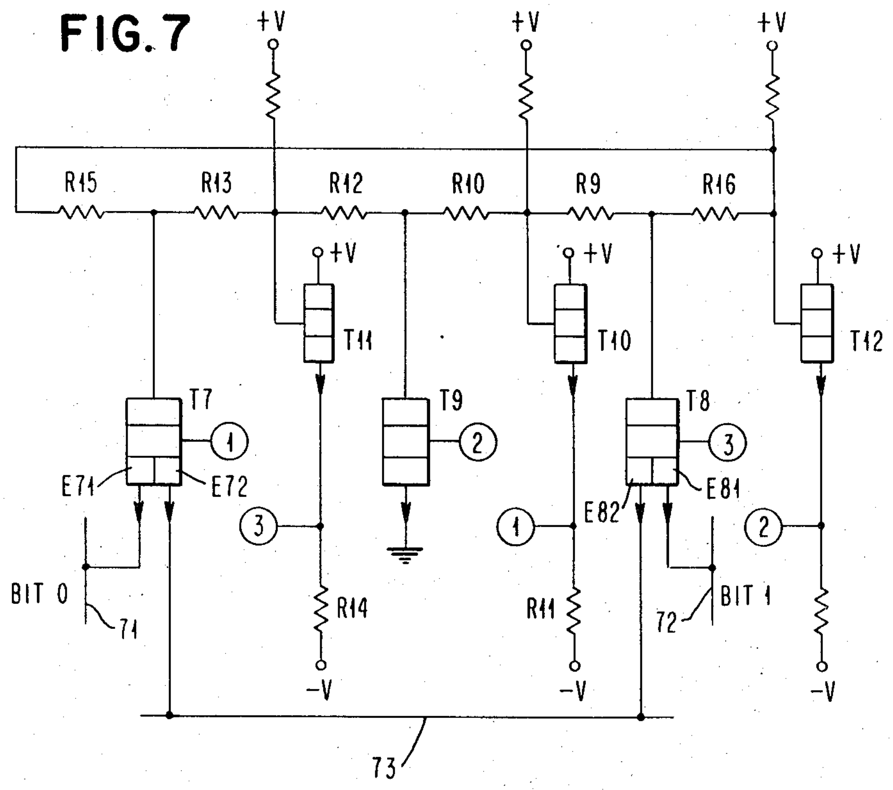
FIG. 7 is a tristable circuit comprising a data storage cell according to the invention.

FIG. 7 shows a tristable circuit suitable for use as a data cell according to the invention. In this figure like circled numbers are used to indicate connections for simplification. Thus the base of transistor T7 is connected to the emitter of transistor T10 since both are shown connected to a 1 in a circle. Now referring to FIG. 7, the cell comprises double-emitter transistors T7, T8 and a conventional transistor T9. The cellectors of transistors T8 and T9 are coupled to the base of transistor T7 through the resistors R9, R10, respectively, and the emitter follower circuit comprising transistor T10 and resistor R11. The collectors of transistors T9 and T7 are coupled to the base of transistor T8 through resistors R12, R13, respectively, and the emitter follower circuit comprising transistor T11 and resistor R14. The collectors of transistors T7 and T8 are coupled to the base of transistor T9 through resistors R15, R16, respectively, and the emitter follower circuit comprising transistor T12 and resistor R17. Emitter E71 of double emitter transistor T7 is directly connected to bit 0 line 71 and emitter E81 of double-emitter transistor T8 is directly connected to bit 1 line 72. Emitter E72 of transistor T7 and emitter E82 of transistor T8 are directly connected to word emitter line 73. The methods of interrogating the state of the data cell of FIG. 7 and of reading, or writing into, the cell are similar to those described with reference to FIG. 4 and involve selectively connecting the bit and word emitter lines 71 to 73 to different voltage sources. The means for effecting such connections may comprise switches such as are shown in FIG. 4 and which have, for clarity, been omitted from FIG. 7.

The data cell of FIG. 7 has three stable states each characterized by one out of the three transistors being conductive. The 0 state is characterized by transistor T7 being conductive, the 1 state by transistor T8 being conductive, and the X state by transistor T9 being conductive. The circuit of FIG. 7 effectively comprises three threshold circuits which are, respectively, resistors R9, R10 and transistor T7, resistors R12, R13 and transistor T8, and resistors R15, R16 and transistor T9. The emitter followers connected between the resistors and the base of the transistor associated with the resistors are provided, as in the embodiments of FIGS. 5 and 6, to raise the D.C. level at the base, thereby preventing saturation of transistors T7, T8, T9 of the transistor. The provision of the emitter followers is not essential but is a desirable feature of the design. Each threshold circuit is such that if and only if both the transistors, for example T8 and T9, the collectors of which are directly connected to the resistors, for example R9, R10, are nonconductive is the voltage at the base of the transistor, for example T7, to which the resistors are connected appropriate to maintain the latter transistor conducting. It follows that only one of the transistors T7 to T9 is conductive at a time, and that transistor T9 can selectively be rendered conducting or nonconducting by controlling the conductivity of transistors T7 and T8 by suitable voltages applied on the bit lines 71, 72, and the word emitter line 73.

Interrogation for 0 is effected, as for the cell of FIG. 4, by placing such voltages on the bit lines 71, 72, that if current is flowing in transistor T7 it is steered through emitter E71 to the 0 bit line, whereas if current is flowing in transistor T8 it is steered through emitter E82 to the word emitter line 73, thereby indicating no match. Interrogation for 1 is similar, with voltages on the bit lines reversed. If, upon either interrogation, the circuit is in the X state with T9 conductive, no significant current can reach the word emitter line 73 and a match is signalled. A null interrogation is effected by placing such voltages on the bit lines that no significant current can reach the word emitter line even if T7 or T8 is conductive. Reading is effected by placing such a voltage on word emitter line 73 that if current is flowing in transistor T7 or T8 it is diverted to the associated bit line 71 or 72 thereby indicating the state of the cell. If T9 is conductive, no current will appear on either bit line. Writing is effected by placing such a voltage on the word emitter line 73 that the switching threshold of transistors T7 and T8 is lowered, while placing voltages on the bit lines such as to send the required transistor conductive or nonconductive.

While the invention has been particularly shown and described with reference to preferred embodiments thereof, it will be understood by those skilled in the art that various changes in form and details may be made therein without departing from the spirit and scope of the invention.

What is claimed is:

1. In a tristable associative memory with a first bit line for interrogating for the first of the stable states, a second bit line for interrogating for the second of the stable states and a word line for the receipt of responses to interrogations on the bit lines, the improvement comprising:

(a) a tristable storage cell including:

(i) a first multiple emitter means with a first emitter coupled to the first bit line and a second emitter coupled to the word line;

(ii) a second multiple emitter semiconductor means with a first emitter coupled to the second bit line and a second emitter coupled to the word line; and (iii) multistable circuit means for maintaining said first multiple emitter means conductive when the storage cell is in its first stable state and nonconductive when the storage cell is in the second and third stable states and for maintaining said second multiple emitter means conductive when the storage cell is in the second stable state and nonconductive when the storage cell is in the first and third stable states; and (b) means for biasing the first bit line relative to the word line to interrogate the storage cell for the first of the stable states to cause the first multiple emitter means to conduct current to the first bit line when the storage cell is in the first of the stable states and for biasing the second bit line relative to the word line to interrogate the storage cell for the second of the stable states to cause the second multiple emitter means to conduct current to the second bit line when the storage cell is in the second of the stable states;

whereby the storage cell provides a first indication output on the word line when the storage cell stores the interrogated state of the first two states or the third state and a second indication of output when it states the noninterrogated state of the first two states.

2. The structure of claim 1 wherein said tristable storage cell comprises two bistable trigger circuits where each of the bistable trigger circuits includes one of said multi-emitter semiconductor means and a second semiconductor means cross coupled so as to have one state wherein the multi-emitter semiconductor means is conducting and another state where the second semiconductor is conducting.

3. The structure of claim 1 wherein said tristable storage cell comprises a tristable circuit including the two mentioned multi-emitter semiconductor means and a third semiconductor means which conducts when the storage cell is in the third stable state.

4. In a tristable associative memory with a first bit line for interrogating for the first of the stable states, a second bit line for interrogating for the second of the stable states, and a word line for the receipt of responses to interrogations on the bit lines, an improved tristable storage cell including:

(a) tristable storage cell comprising:

(i) a first current switching semoconductor means coupled to the first bit line and the word line for diverting current from the word line to the bit line in response to interrogation signals applied to the first bit line when the storage cell is in the first of the stable states;

(ii) a second current switching semoconductor means coupled to the second bit line and the word line for diverting current from the word line to the bit line in response to interrogation signals applied to the second bit line when the storage cell is in the second of the stable states;

(iii) multistable circuit means for rendering said first current switching semiconductor means conductive when the storage cell is in its first stable state and nonconductive when the storage cell is in the second and third stable states and for maintaining said second semiconductor current means conductive when the storage cell is in the second stable state and nonconductive when the storage cell is in the first and third stable states; and (b) interrogating means to apply interrogation signals to the first bit line for interrogating the storage cell for the first stable state and to apply interrogation signals to the second bit line for interrogating the storage cell for the second stable state whereby the storage cell provides a first indication output on the word line when the storage cell stores the interrogated of the first two states or the third state and a second indication output when it stores the non-interrogated state of the first two states.

5. The structure of claim 4 wherein said first and second current switching semiconductor means are double emitter transistors connected in separate bistable circuits.

6. The structure of claim 5 wherein one of the emitters of the first of the double emitter transistors is connected to the first bit line and the other emitter of the first of the double emitter transistors is connected to the word line while one of the emitters of the second of the double emitter transistors is connected to the second bit line and the other emitter of the second of the double emitter transistors is connected to the word line.

References Cited

UNITED STATES PATENTS

| | | | |
|---|---|---|---|
| 3,295,031 | 12/1966 | Schmitz | 340—173 X |
| 3,423,737 | 1/1969 | Harper | 340—173 |

TERRELL W. FEARS, Primary Examiner

U.S. Cl. X.R.

307—238, 279, 292